(12) United States Patent
Weinberg et al.

(10) Patent No.: US 6,269,696 B1
(45) Date of Patent: Aug. 7, 2001

(54) TEMPERATURE COMPENSATED OSCILLATING ACCELEROMETER WITH FORCE MULTIPLIER

(75) Inventors: Marc S. Weinberg, Needham, MA (US); Nathan A. St. Michel, Houston, TX (US); David S. Nokes, Lexington; Jeffrey T. Borenstein, Belmont, both of MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 0 days.

(21) Appl. No.: 09/483,326

(22) Filed: Jan. 14, 2000

(51) Int. Cl.$^7$ ....................................... G01P 15/08
(52) U.S. Cl. ............................. 73/497; 73/514.37
(58) Field of Search ................... 73/497, 514.29, 73/514.15, 862.59, 862.621, 862.623, 514.37, 514.36, DIG. 1

(56) References Cited

U.S. PATENT DOCUMENTS

| | | | |
|---|---|---|---|
| 5,188,983 | * | 2/1993 | Guckel et al. ................ 437/209 |
| 5,289,719 | * | 3/1994 | Egley et al. ..................... 73/497 |
| 5,996,411 | * | 12/1999 | Leonardson et al. ......... 73/514.29 |

* cited by examiner

*Primary Examiner*—Helen Kwok
(74) *Attorney, Agent, or Firm*—Iandiorio & Teska

(57) ABSTRACT

A temperature compensated oscillating accelerometer with force multiplier includes a support substrate; a tuning fork suspended above the substrate; a primary anchor device connected between the tuning fork and substrate; a proof mass having an input axis; a force multiplier interconnected between the proof mass and the tuning fork; and a force multiplier anchor connected to the substrate and disposed at approximately the same area along the input axis as the primary anchor for offsetting the opposing effects of thermal expansion and stiffness in response to variations in temperature.

8 Claims, 4 Drawing Sheets

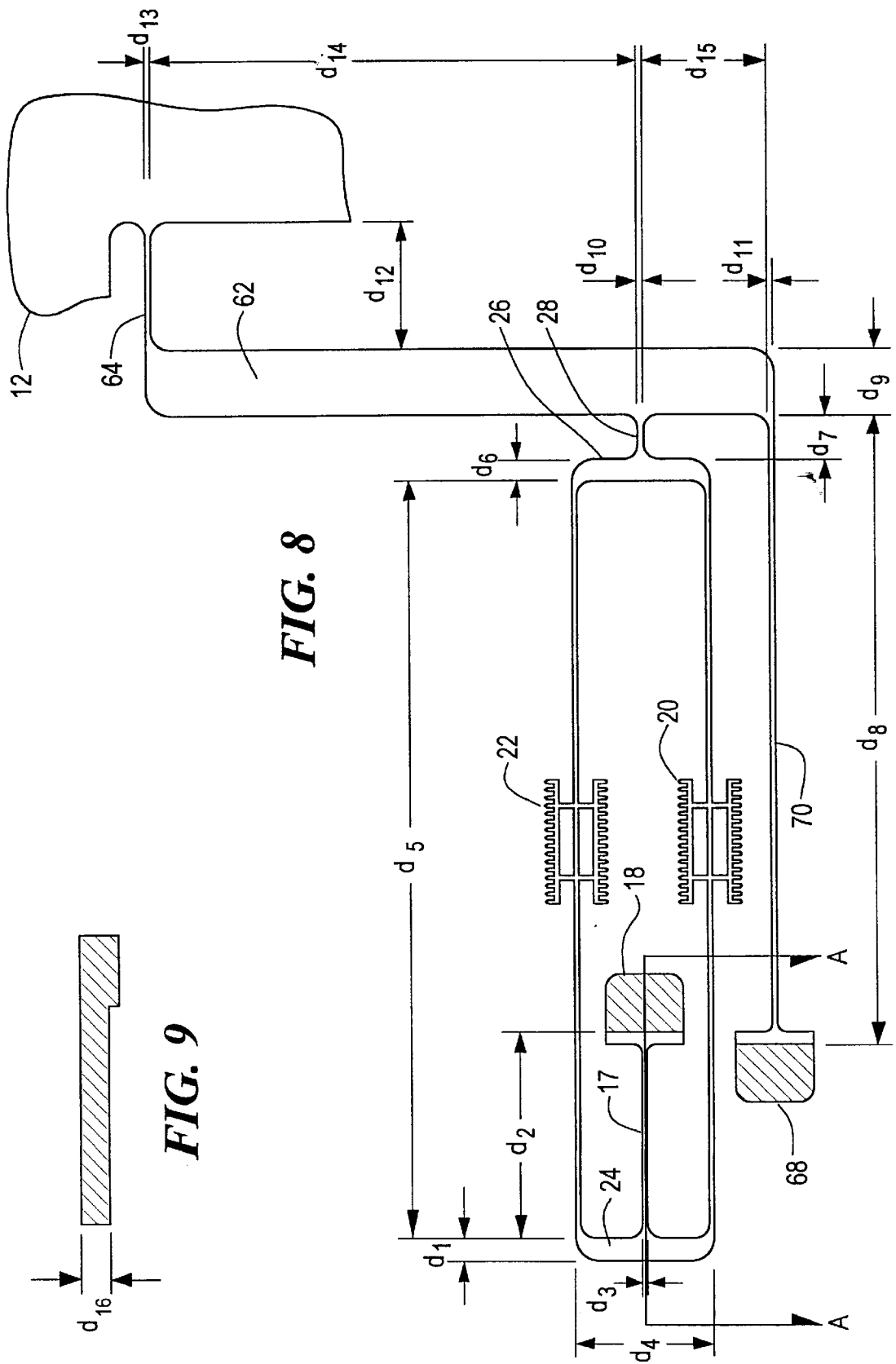

2

TEMPERATURE COMPENSATED OSCILLATING ACCELEROMETER WITH FORCE MULTIPLIER

FIELD OF INVENTION

This invention relates to a temperature compensated oscillating accelerometer with force multiplier.

BACKGROUND OF INVENTION

Accelerometers require either a frequency or voltage reference. Voltage references hardened against radiation are not available so that frequency referenced accelerometers are preferred for strategic applications. Frequency based accelerometers include silicon micromachined devices and quartz devices. Because of limitations in making small quartz beams, the quartz accelerometers are large and made of several hand-assembled pieces, whose joints cause performance-limiting errors. Silicon micromachining offers smaller size and lower cost in more reliable monolithic accelerometers but suffer less than desired performance, thermal sensitivity and fabrication yield.

These accelerometers typically have a proof mass suspended above a substrate. A tuning fork is connected to the substrate through an anchor at one end and to the proof mass at the other end. The tuning fork has a certain mechanical resonance with no acceleration applied. A force current supplied to the tuning fork causes a sense current whose frequency is a function of that mechanical resonance. When an acceleration occurs the proof mass moves relative to the substrate causing the tuning fork to be stretched or compressed depending on the direction of acceleration along the input axis. Stretching increases the stiffness and thus the frequency of the sensed current. Compression decreases stiffness and the frequency. This change in frequency can be used to measure the acceleration. Often two tuning forks are used arranged so that when one is stretched the other is compressed. Frequency shift between the two improves the representative signal and suppresses common mode errors. One improvement on these accelerometers employs a force multiplier in the form of a lever and a second anchor to multiply the force of the acceleration applied to the tuning fork. In both approaches errors occur with variation in temperature due to two different error sources, Young's modulus and the coefficient of thermal expansion. An increase in temperature causes the elements to expand, and increase the tension and, hence, stiffness and thus the frequency of the tuning fork and sense current. But an increase in temperature causes Young's modulus to decrease in silicon and stiffness decreases with decreases in Young's modulus. A decrease in stiffness results in a drop in frequency of the sense current. The two effects have opposing effects on the accuracy of the tuning fork.

BRIEF SUMMARY OF THE INVENTION

It is therefore an object of this invention to provide an improved temperature compensated oscillating accelerometer with force multiplier.

It is a further object of this invention to provide such an improved temperature compensated oscillating accelerometer with force multiplier which balances variations in Young's modulus with tensions induced by thermal expansion.

It is a further object of this invention to provide an improved temperature compensated oscillating accelerometer with force multiplier which has a high scale factor and high axial resonant frequency.

It is a further object of this invention to provide an improved temperature compensated oscillating accelerometer with force multiplier which is small in size suitable for micromachining and silicon implementation.

The invention results from the realization that an oscillating accelerometer can be temperature compensated by placing the anchor associated with the force multiplier in approximately the same area along the input axis as the primary tuning fork anchor to offset the opposing effects of thermal expansion and stiffness with variations in temperature.

This invention features a temperature compensated oscillating accelerometer with force multiplier including a support substrate and a tuning fork suspended above the substrate. There is a primary anchor device interconnected between the tuning fork and substrate and a proof mass having an input axis. A force multiplier is interconnected between the proof mass and the tuning fork and a force multiplier anchor is connected to the substrate and disposed at approximately the same area along the input axis as the primary anchor for offsetting the opposing effects of thermal expansion and stiffness in response to variations in temperature.

In a preferred embodiment the support substrate may be glass and the tuning fork may be silicon. The tuning fork may include a pair of tuning fork masses connected in parallel between an upper and lower base beam. The tuning fork and primary anchor may suspend the proof mass from the substrate. The proof mass may be suspended from the substrate by at least one auxiliary anchor. The force multiplier may include a force multiplier beam and a thermal compensation beam interconnected between the force multiplier beam and the force multiplier anchor. The force multiplier may be laterally spaced from and adjacent the primary anchor.

BRIEF DESCRIPTION OF THE DRAWINGS

Other objects, features and advantages will occur to those skilled in the art from the following description of a preferred embodiment and the accompanying drawings, in which:

FIG. 8 is a diagrammatic view of an accelerometer according to this invention showing actual dimensions; and FIG. 9 is a sectional view along 9—9 of FIG. 8.

Figure 1:
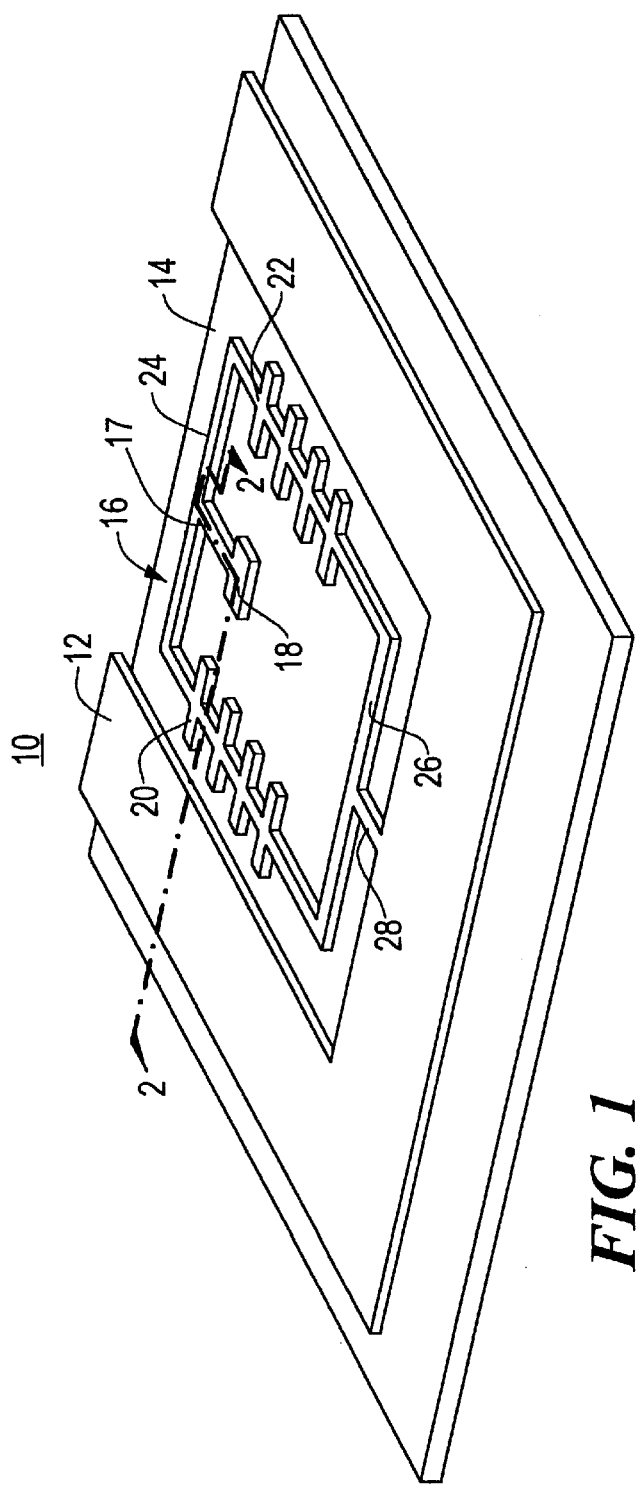
FIG. 1 is a schematic three-dimensional view of one half of a prior art micromachined silicon oscillating accelerometer.
Figure 2:
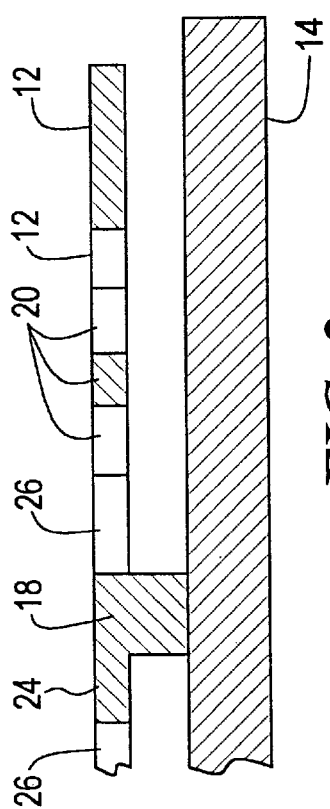
FIG. 2 is a sectional view along line 2—2 of FIG. 1.

There is shown in FIG. 1 a prior art oscillating accelerometer 10 including proof mass 12 suspended above substrate 14. Proof mass 12 may typically be silicon and substrate 14 may be glass. Tuning fork 16 may be connected by beam 17 between primary anchor 18 on substrate 14 and proof mass 12. Tuning fork 16 may actually include two tuning fork masses 20 and 22 connected in parallel between upper and lower base beams 24 and 26. A connector beam 28 interconnects beam 26 and proof mass 12. The spatial relationship of proof mass 12, substrate 14 and tuning fork 16 may better be seen by reference to FIG. 2, where it can be seen that the tuning fork extends from beam 24 towards beam 26.

Figure 3:
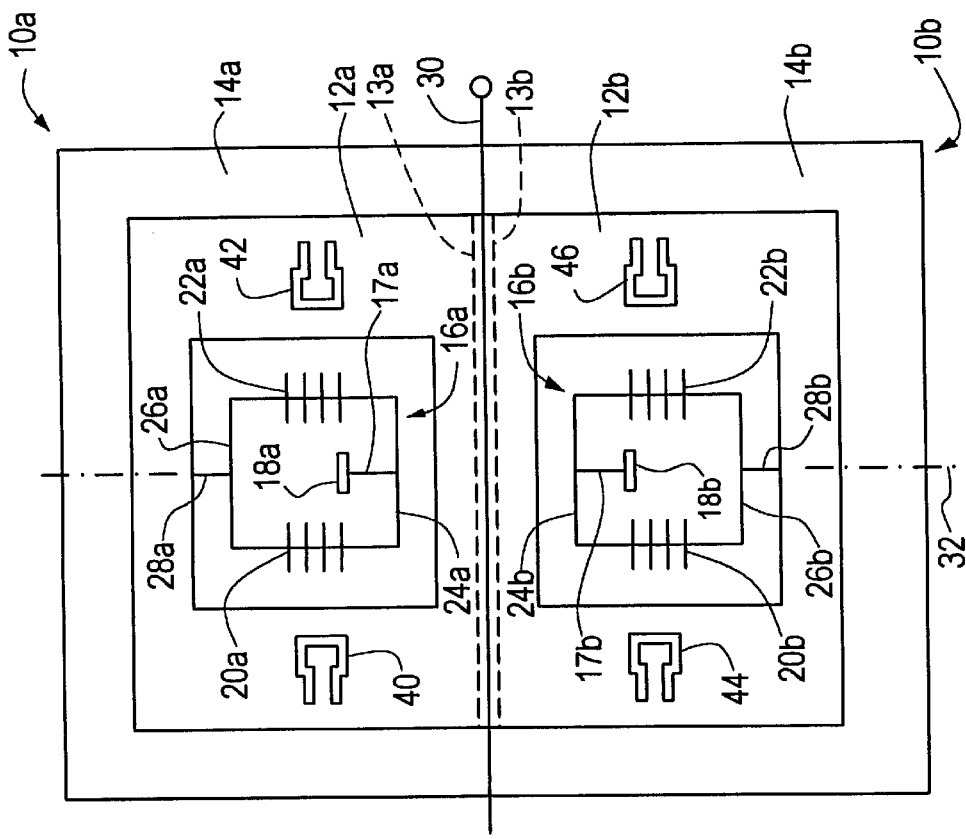
FIG. 3 is a top plan schematic view of a prior art dual tuning fork accelerometer construction utilizing two prior art accelerometers arranged in tandem.

Typically accelerometer 10 is used in pairs arranged in tandem as shown in FIG. 3 in conventional prior art devices. Proof masses 12a, 12b may be made integral as shown in FIG. 3 or may be separate elements as indicated by phantom edges 13a, 13b. Although the tuning fork masses are shown inside the accelerometer proof mass this is not always the case: they may be disposed outside the accelerometer proof mass as well. Accelerometers 10a and 10b are shown connected in tandem symmetrical about line 30 so that an acceleration along input axis 32 causes one of the accelerometers to experience compression and the other expansion with respect to their respective anchors 18a and 18b, thus offsetting any common mode error sources and increasing the amplitude of the sense current which measures the acceleration. Also shown in FIG. 3 are auxiliary anchors 40, 42, 44 and 46 one or more of which may be used to provide an additional suspension function for holding proof mass 12a, 12b above substrate 14a, 14b.

Figure 4:
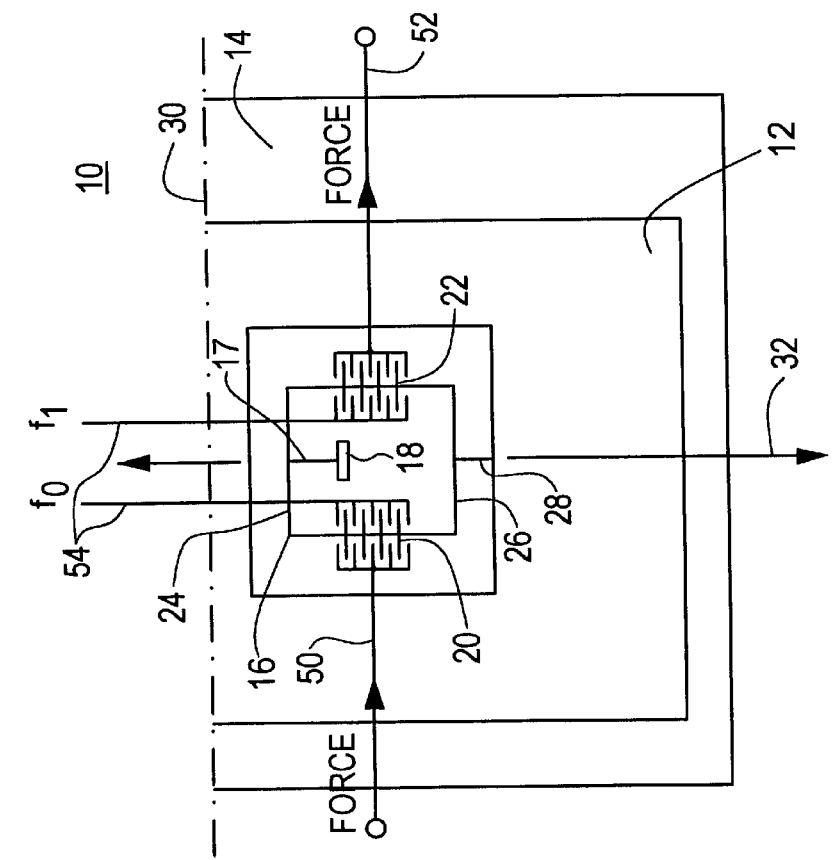
FIG. 4 is a top plan schematic view of the prior art accelerometer of FIGS. 1–3.

In operation, a force current is delivered on line 50 and 52, FIG. 4, to tuning fork 16 and the sense current is provided on line 54. Initially with no acceleration and no stress on the tuning fork proof masses 20 and 22, the output frequency on line 54 has a predetermined value $f_0$. An acceleration applied along input axis 32 will either expand or contract the beams attached to the tuning fork masses 20 and 22, thereby either increasing or decreasing the output frequency on line 54 to a value $f_1$. The difference $\Delta f$ between $f_0$ and $f_1$ represents the force of the acceleration as is well known in the art.

Figures 5, 6, 7:
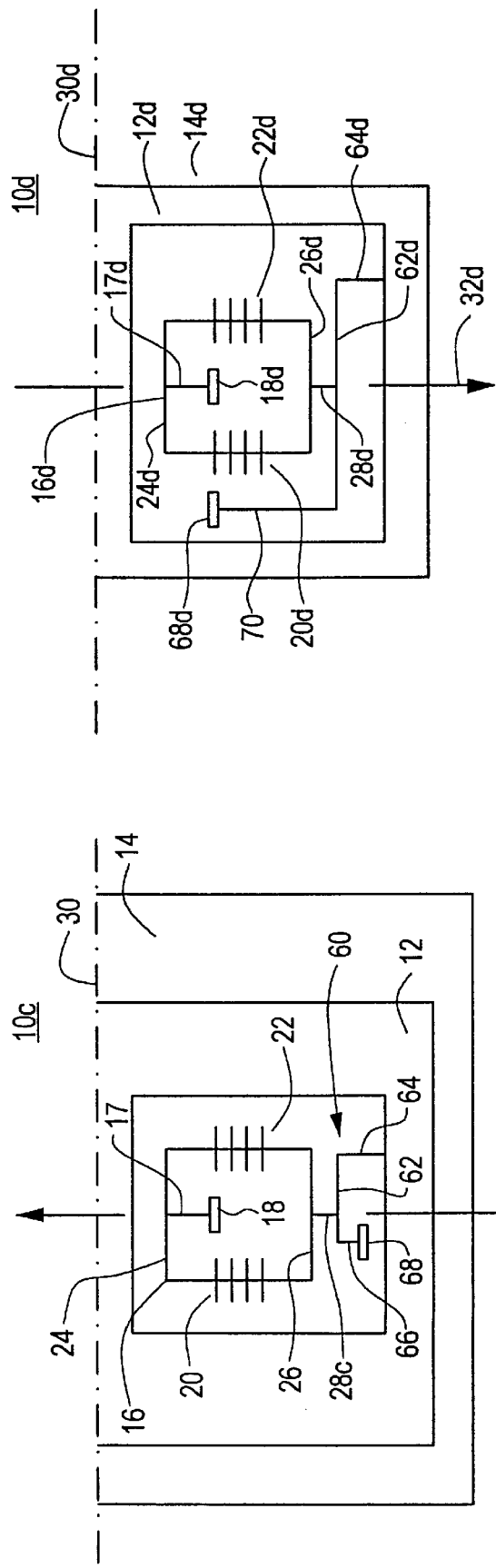
FIG. 5 is a view similar to FIG. 4 of a prior art accelerometer with a force multiplier.
FIG. 6 is a top plan schematic view similar to FIGS. 5 and 6 of a temperature compensated oscillating accelerometer with force multiplier according to this invention.
FIG. 7 is a schematic illustration of the forces on an accelerometer with force multiplier according to this invention.

Also well known in the art is the improvement shown in FIG. 5 wherein a force multiplier 60 has been introduced between tuning fork 16 and proof mass 12. Force multiplier 60 includes a force multiplier beam 62, a proof mass connector beam 64, a fulcrum beam 28c, and an anchor beam 66 connected with anchor 68 which is mounted on substrate 14. An acceleration along input axis 32 now is amplified by the lever action of force multiplier beam 62 in accordance with the ratio of the length of the beam to the right of fulcrum beam 28c to the length which is to the left of fulcrum beam 28c. As explained in the Background, this prior art improvement, FIG. 5, as well as the basic prior art construction shown in FIGS. 1–4, are subject to errors due to variations in temperature. An increase in temperature can cause an expansion which acts as an acceleration along the input axis 32 causing an increase in the frequency, falsely indicating that an acceleration is taking place. Simultaneously and conversely, an increase in temperature causes Young's modulus to decrease in the silicon and stiffness decreases with decreases in Young's modulus. A decrease in stiffness therefore results in a drop in frequency of the sensed current. The opposite occurs in both cases when the temperature decreases. In prior art devices the accelerometers may be made of quartz or silicon. In quartz, cuts are available so that the Young's modulus variation with temperature is small. Generally one then uses two accelerometers, each with one proof mass and one tuning fork. Ideally, the tuning forks are connected to the substrate at a single end so that base expansion does not affect tension and, hence, tuning fork resonant frequency. In silicon, Young's modulus is −50 to −80 ppm/° C. (depending on the data's source). The invention cancels the Young's modulus thermal sensitivity with effects determined by the difference in thermal expansion coefficients between the silicon and glass substrate. While the thermal sensitivities of quartz vibrating accelerometers are generally lower than those of silicon devices, silicon offers other unique advantages. In particular, the anchor regions are small compared to the substrate and far removed from points where the substrate connects to the surroundings. This results in high quality factors which results in good sensor repeatability. The anchors are rigidly connected to the substrates by the manufacturing process in contrast to the lossy and non-repeating forces involved in mounting quartz devices.

In accordance with this invention, multiplier anchor 68d, FIG. 6, is disposed generally at the same level along input axis 32 as primary anchor 18d by virtue of thermal compensation beam 70 which is interconnected with force multiplier beam 62. By placing multiplier anchor 68d approximately at the same level as primary anchor 18d the excursion in one direction due to the Young modulus effect is made to just offset the excursion in the other direction caused by the coefficient of thermal expansion effect.

The high scale factor (frequency change with acceleration), low thermal sensitivity, and high axial motion resonant frequency are explained in the following paragraphs. In the eigenmode known as the tuning fork, the two proof masses 20 and 22 move anti-parallel perpendicular to the input axis and in the substrate plane. For masses supported by beams of length ½ with two built in ends; the tuning fork resonant frequency is set mainly by the beams supporting the proof mass and is determined approximately by $$\omega = \sqrt{\frac{2}{m}\left[\frac{12EI}{(l/2)^3} + \frac{6F}{5(l/2)}\right]} \qquad (1)$$

where I=the area moment of inertia for one beam m=mass of one proof mass 20 or 22

F=axial force in tuning fork beams supporting mass 20 or 22 l=total length of beams

In equation 1, the first term is the stiffness calculated from simple beam theory without axial tension. The entire expression is the resonant frequency with axial load.

FIG. 7 is a simple model of the axial motion for the accelerometer shown in FIG. 6 where the anchors are attached to the glass substrate and the lever 62d end, where the acceleration force $F_a$ is applied, is attached to mass 12. The connection between beams are modeled as pin joints, an approximation which is valid when the connecting beams 70, 28 and 64d are flexible compared to the lever 62d and the tuning fork ends 24d and 26d. This model is approximately correct and is useful for explaining the fundamentals. The springs represent stiffness in the vertical direction, the sensitive axis of FIG. 6. Final dimensions are determined by finite element analysis and by testing actual hardware. The axial force F in the tuning forks (20 or 22) is caused by accelerating the proof mass and by thermal expansion and is described by:

$$F = nF_a + dT(\alpha_g - \alpha_s)k_{ax}n[(L_2 - L_3)(n-1) - L_1] \qquad (2)$$

where the effective proof mass axial stiffness is $$\frac{x_5}{F_a} = \frac{1}{k_{ax}} = \frac{n^2}{k_2} + \frac{(n-1)^2}{k_3} + \frac{1}{k_4} \quad (3)$$

where n=lever force multiplication
- $k_2$=axial stiffness of tuning fork (20) combined with base beam (26)
- $k_3$=axial stiffness between lever and anchor (70)
- $k_4$=axial stiffness between lever and proof mass (28d)
- $L_1$=distance from proof mass center line 30d to anchor 18d
- $L_2$=length from anchor 18d to lever 62d. This includes tuning fork (20) and base beams (26)
- $L_3$=beam length from anchor to lever (70)
- $\alpha_s$=silicon proof mass thermal expansion coefficient
- $\alpha_g$=glass substrate thermal expansion coefficient (substrate can be made of other materials; $\alpha_g$ includes effect of material to which substrate is attached)
- dT=temperature variation
- $F_a$=force applied to levers by proof mass acceleration. For FIG. 6, this force is $-m_p a/2$ (one mass, two tuning forks) where a is the instrument acceleration along the input axis.

A good design makes the change in resonant frequency from input acceleration large while the effects of thermal changes are small. Typically, the nominal tuning fork eigenfrequency is, but is not limited to, 20 to 30 kHz while the desired frequency variation with input axis acceleration is 50 to 100 Hz/g. The lever 62d and fulcrum multiply the force applied by the accelerometer mass 12 by the factor n, equation (3). The multiplication is very important since it allows increasing scale factor or decreasing the proof mass size. Smaller proof masses are more easily fabricated in the current state of silicon micromachining.

From equation (1), the resonant frequency, the instrument output, varies with Young's modulus and axial force, which depends on thermal expansion and acceleration loading per equation (2). For silicon, the Young's modulus decreases with temperature, roughly −50 to −80 ppm/° C. (depending on the source). Designs such as those in the prior art FIGS. 1, 3, 4 and 5 have large thermal sensitivities.

Generally, the frequency change from thermal expansion term is much larger than that from Young's modulus unless the design follows concepts taught herein. For a beam built in at both ends, the Young's modulus variation in equation (1) is approximately 100 times smaller than the axial force variation caused by the thermal expansion, equation to (2). The thermal expansion variation in axial force and, hence, resonant frequency can be made small and can be adjusted to cancel the Young's modulus effect by:

1. Increasing the axial compliance. Increasing the force multiplication (indicated by the factor n) decreases the axial stiffness. It is desirable to obtain a large force multiplication; however, one also seeks to maintain the proof mass axial resonance ($\sqrt{2K_{ax}/m_p}$) above 4 kHz to avoid mechanical vibration where the highest expected input frequency is no more than 2 kHz. The mass $m_p/2$ (12) pulls on each tuning fork lever (62d). Because of the resonant frequency, adjusting the axial stiffness is insufficient to achieve low thermal sensitivity.

2. Reducing the thermal expansion mismatch. The selection of material is limited. Typically, the fabrication procedure uses glass and silicon so that the glass thermal expansion is limited to 2.5 or 3.3 ppm/° C. while silicon's expansion is a 2.6 ppm/° C. at room temperature.

3. Adjusting the beam lengths. Because the fulcrum is near the beam 70, whose length is $L_3$, the stretching of the tuning fork is mainly determined by the lengths $L_2$ and $L_3$, a relation shown in equation (2). The quantity $L_2-L_3$ in equation (2) reflects the reversing of the beam (70). In the prior art (FIGS. 1, 3, and 4), $L_3$ points away from the masses 20 and 22 so that $L_3$ is negative and, hence, $L_2,-L_3$, and the thermal sensitivity become large. After detailed finite element analysis, several designs with various lengths for $L_3$, are constructed to identify a low thermal sensitivity design. This length selection accounts for the uncertainty in silicon's Young's modulus, analytic approximations, and contributions of the base upon which the accelerometer is mounted.

Because the force multiplier n decreases axial stiffness (equation 3), the base beams 24d and 26d must be wider and, hence, stiffer than in the prior art (FIGS. 1, 3 and 4). To maintain the lever action and avoid further compliance, the lever 62d must be wide and rigid. For the right angles to act as pin joints (FIG. 7), the connecting beams 28d, 70, and 64d must be compliant in bending compared to the base beams 24d and 26d and the lever 62d. It should be understood that the four design adjustments 1.–3., supra, enable temperature compensation when the substrate coefficient of thermal expansion is either greater than or less than that of the silicon.

Equations (1) through (3) are used for instruction and preliminary design. Actual designs must be done by finite element analysis and prototype construction. FIG. 8 shows one set of parameters which satisfy all the design objectives listed above; that is, high scale factor, low thermal sensitivity, and high axial eigenfrequency. These parameters also result in small coupling between the two tuning forks. The axial compliance results in small stiffness non-linearity as the proof mass moves horizontally in FIG. 6. Table I lists the actual dimensions for $d_1-d_{16}$ in microns.

TABLE I $d_1$ = 45.00
$d_2$ = 402.50
$d_3$ = 7.00
$d_4$ = 264.00
$d_5$ = 1472.50
$d_6$ = 45.00
$d_7$ = 83.00
$d_8$ = 1216.20
$d_9$ = 125.00
$d_{10}$ = 10.00
$d_{11}$ = 10.00
$d_{12}$ = 253.50
$d_{13}$ = 10.00
$d_{14}$ = 1070.00
$d_{15}$ = 238.00
$d_{16}$ = 50.00

If two separate, not connected, proof masses each supported by a single tuning fork are used, the length L1 in equation (2) is effectively zero. Adjusting L2-L3 will still enable small thermal sensitivity. This may be important in decoupling the tuning forks.

Performance of any sensor is improved by symmetry. Ideally four levers and tuning fork would achieve top to bottom and left to right symmetry. Because of space constraints, practical designs used two tuning forks whose levers can be either parallel or anti-parallel.

Although specific features of the invention are shown in some drawings and not in others, this is for convenience only as each feature may be combined with any or all of the other features in accordance with the invention.

Other embodiments will occur to those skilled in the art and are within the following claims:

What is claimed is:

1. A temperature compensated oscillating accelerometer with force multiplier comprising:
   a support substrate;
   a tuning fork suspended above said substrate;
   a primary anchor device interconnected between said tuning fork and said substrate;
   a proof mass having an input axis;
   a force multiplier interconnected between said proof mass and said tuning fork; and
   a force multiplier anchor connected to said substrate and disposed at approximately the same level along the input axis as said primary anchor device for offsetting the opposing effects of thermal expansion and stiffness in response to variations in temperature.

2. The temperature compensated oscillating accelerometer of claim 1 in which said support substrate is glass.

3. The temperature compensated accelerometer of claim 1 in which said tuning fork is silicon.

4. The temperature compensated accelerometer of claim 1 in which said tuning fork includes a pair of tuning fork masses connected in parallel between an upper and lower base beam.

5. The temperature compensated accelerometer of claim 1 in which said tuning fork and said primary anchor device suspend said proof mass from said substrate.

6. The temperature compensated accelerometer of claim 1 in which said proof mass is suspended from said substrate by at least one auxiliary anchor.

7. The temperature compensated accelerometer of claim 1 in which said force multiplier includes a force multiplier beam and a thermal compensation beam interconnected between said force multiplier beam and said force multiplier anchor.

8. The temperature compensated accelerometer of claim 1 in which said force multiplier is laterally spaced from and adjacent said primary anchor device.

* * * * *